March 14, 1967 F. MAYER 3,309,633

ANTI-PARASITE ELECTRIC CABLE

Filed Jan. 10, 1963 2 Sheets-Sheet 1

INVENTOR
Ferdy Mayer

BY Spencer & Kaye
ATTORNEYS

March 14, 1967 F. MAYER 3,309,633

ANTI-PARASITE ELECTRIC CABLE

Filed Jan. 10, 1963 2 Sheets-Sheet 2

INVENTOR
Ferdy Mayer

BY Spencer & Kaye
ATTORNEYS

United States Patent Office 3,309,633

Patented Mar. 14, 1967

3,309,633

ANTI-PARASITE ELECTRIC CABLE

Ferdy Mayer, 8 Blvd. Gambetta, 38 Grenoble, France

Filed Jan. 10, 1963, Ser. No. 250,636
6 Claims. (Cl. 333—79)

The present invention relates to an anti-interference electric cable adapted for use wherever it is necessary to prevent any parasitic radiations within a predetermined frequency range from emanating from the cable. The cable according to the invention will protect all electronic equipment or installations in its region from the interference which would otherwise result from such parasitic radiation.

The present application is a continuation-in-part of my copending patent application Ser. No. 801,554, filed on Mar. 24, 1959, and entitled, "Anti-Parasite Electric Cable," now abandoned. That application discloses a new anti-parasite cable having its conducting element immersed in a surrounding medium whose composition and texture is arranged so as to cause therein substantial losses due to absorption effects in the range of frequencies which it is desired to attenuate. A large number of suitable compositions for the surrounding medium have been identified in the application Ser. No. 801,554. Such anti-parasite cables may best be characterized as comprising at least one conducting element and at least one surrounding medium in which there has been incorporated at least one absorbent material causing substantial losses by absorption effects within a given range of frequencies due to microscopic magnetic and/or dielectric resonances in the material.

The present invention relates more particularly to certain complementary improvements in anti-parasite or anti-interference cables of the same general class as that described in the copending application Ser. No. 801,554.

In such a cable there is incorporated into the composition or mixture forming the surrounding absorbent medium a sufficient quantity of magnetic material so that the resulting composition will have at least two parts by weight of magnetic material to one part by weight of the flexible bonding dielectric material used. The proportion of absorber magnetic material may be reduced when the flexible bonding material is itself adapted to produce substantial corresponding losses.

According to another aspect of the invention, together with the losses of the "series type" caused by the absorption effects of magnetic and/or dielectric resonance, there are combined losses of the "parallel type." These parallel losses are obtained by the incorporation in the flexible surrounding medium of additional dielectric materials selected from high permittivity dielectrics, for example, manganese-zinc ferrites and titanates of barium, bismuth, and strontium.

True "filter-cables" are thus obtained in accordance with the invention which are of particularly great interest in the field of industrial anti-interference cables.

An object of the invention is to provide an improved anti-interference cable suitable for a wide variety of industrial applications.

Another object of the invention is to furnish an electric cable of the character set forth that is simple and rugged in its construction, inexpensive to manufacture, and extremely efficient in use and service.

A further object is to provide an anti-interference electric cable which entirely suppresses radiation therefrom of unwanted parasitic radiations over a selected frequency range.

Various other objects and advantages will appear from the following description of several embodiments of the invention, while the novel features of the invention will be particularly pointed out hereinafter in the appended claims.

In the accompanying drawing forming a part of this specification, it will be seen that:

Figure 5:
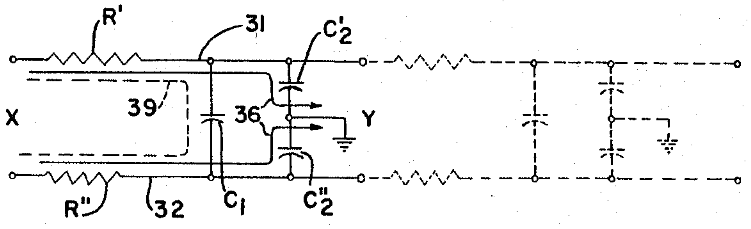
Figure 6:
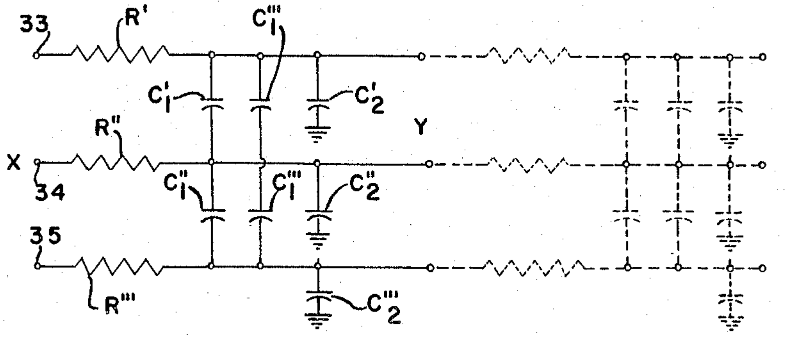

FIGURES 5 and 6 comprise diagrams of equivalent circuits for "filter-cables" to be used, respectively, in single phase and three phase systems.

Figure 7:
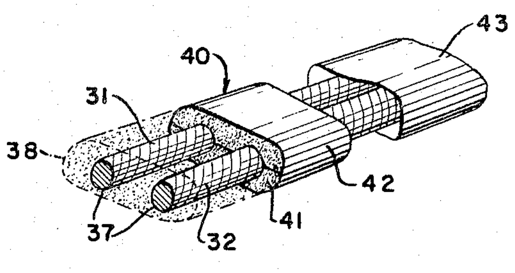
Figure 8:
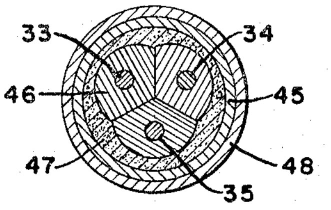

FIGURE 7 is a diagrammatic perspective view of a portion of a "filter-cable" provided according to the invention with localized constants; and FIGURE 8 is a cross-sectional view of a three phase "filter-cable" having distributed constants.

In order to aid the presentation of a clear and concise description of this invention, the details of several anti-parasite cables disclosed in application Ser. No. 801,554 will be considered first. In the exemplary cable shown by FIG. 1, a conductor 1 formed in the usual manner by a copper wire of multiple strands is surrounded by a lossy dielectric sheath 2 and then by an outer sheath 3 of textile fabric. The sheath 2 is made from a mixture of materials having the following composition:

*Composition No. 1*

| | Percent |
|---|---|
| Neoprene (of the poly-2-chlorobutadiene-1,3 type) | 68 |
| Stabilizer (tetraethylthiuram bisulphide) | 2 |
| Carbon black | 20 |
| Bakelite (registered trademark) of the "Catalin 500 base, yellow" type | 10 |
| | 100 |

It has been found in particular from the measurements carried out upon such a cable, that the attenuations obtained with an insulating support medium having composition No. 1 exceed the sum of those provided by the ingredients of the mixture separately.

According to the present invention, another plastic substance whose absorption losses are high and selective is particularly specified: ethylene polytetrasulphide, known by the registered trademark Thiokol. Thus, an improved anti-interference cable of the invention is obtained by forming the sheath 2 of FIG. 1 from the following mixture:

*Composition No. 1A*

| | Percent |
|---|---|
| Thiokol S (ethylene polytetrasulphide, with an excess of polysulphide) | 70 |
| Carbon black | 20 |
| Bakelite of the "Catalin 500 base, yellow" type | 10 |
| | 100 |

Particularly useful results concerning high attenuation over the range of high frequencies of interest have been obtained during tests of the anti-interference cables employing Thiokol.

Another example according to the invention of a pulverulent dielectric substance which can successfully be employed in place of the neoprene of composition No. 1 or the Thiokol of composition No. 1A is Cyanocel, a type of modified cellulose manufactured by American Cyanamid Company; this is a cellulose modified by cyanoethylic substitution; it forms with certain organic solvents and plastics solutions in which all fibrous structure has disappeared.

It has become possible, as a result of the research and development work leading to the improvements of this invention, to identify the conditions affecting the combination of the flexible support materials which may or may not produce dielectric losses or leakage, with materials producing magnetic losses.

In the prior application Ser. No. 801,554, the sheath 2 of FIG. 1 as an alternative embodiment had the following composition:

*Composition No. 2*

| | Percent |
|---|---|
| Rubber | 15 |
| Carbon black | 5 |
| Ferrite, "Ferroxcube (nickel-zinc)" | 80 |
| | 100 |

Figure 2:
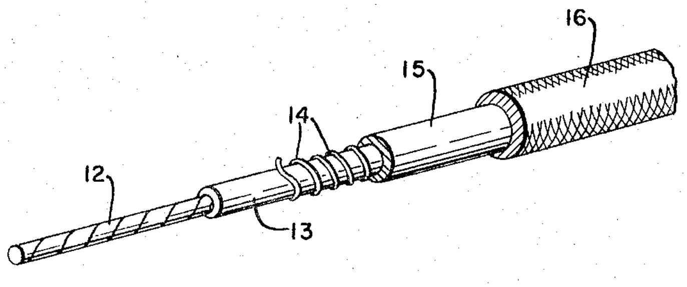

The cable shown in FIG. 2 was disclosed in application Ser. No. 801,554 as comprising a textile braid 12, a core 13 surrounding the braid, a winding 14 of pure iron wire of 1/10 mm. diameter, with a space of 3/10 mm. between turns, a sheath 15 surrounding winding 14, and an outer sheath 16 of polyvinyl. The sheath 15 has the composition No. 2 above, while the core 13 is made from the following composition:

*Composition No. 3*

| | Percent |
|---|---|
| Vinyl | 20 |
| Ferrite Mn–Zn known under the name of "Ferroxcube 3B" | 80 |
| | 100 |

A cable constructed in this way has an attenuation of the order of 80 decibels per meter at 100 megacycles per second.

In the compositions of the nature of those specified above as No. 2 and No. 3, the ferrite is used in the form of a powder whose grain size is characterized by the fact that the minimum size of the grains is at least a few tens of microns, and is preferably of the order of 50 to 100 microns. The particles thus will retain a stepped or graded structure so that absorptive effects or losses are obtained which are practically equivalent to those produced by compact bodies. The absorbent magnetic substance should be used in as dense or concentrated a form as possible, while still retaining the necessary flexibility of the cable. In the magnetic absorption cables of the invention, the content of rubber or other flexible bonder is made lower than 30% and is preferably reduced to values of the order of 20%.

Figure 1:
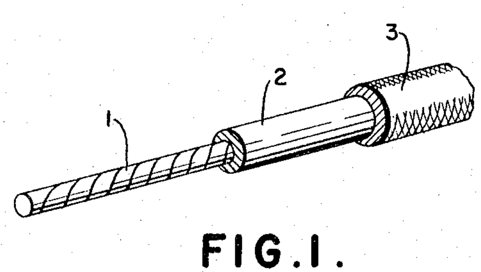
FIGURES 1 and 2 illustrate two typical constructions of anti-parasite cables as disclosed in the aforementioned application Ser. No. 801,554.

In those cables according to the invention having supporting rubbers or flexible bonders which themselves produce substantial losses by absorption, the proportion of absorbent magnetic material may be reduced accordingly. An example of a composition of this nature now found suitable for the sheaths and cores of cables in FIGS. 1 and 2 is the following:

*Composition No. 4*

| | Percent |
|---|---|
| Thiokol S | 30 |
| Ferrite | 70 |
| | 100 |

The ferrite listed has fine grains of 10 to 50 microns and is composed of a mixture of equal parts (35%–35%) of Mn-Zn ferrite (type 111–B) and Ni-Zn ferrite (type IV–B). The tests actually performed to date establish that such combinations of a high-loss magnetic medium with a high-loss dielectric medium produce novel effects which multiply the attenuation obtained. It has been found that for each particular combination of this kind the optimum mixture depends upon the corresponding constants $\epsilon'$, $\epsilon''$, $\mu'$ and $\mu''$ of the complex permittivity or permeability of each medium employed.

Figure 3:
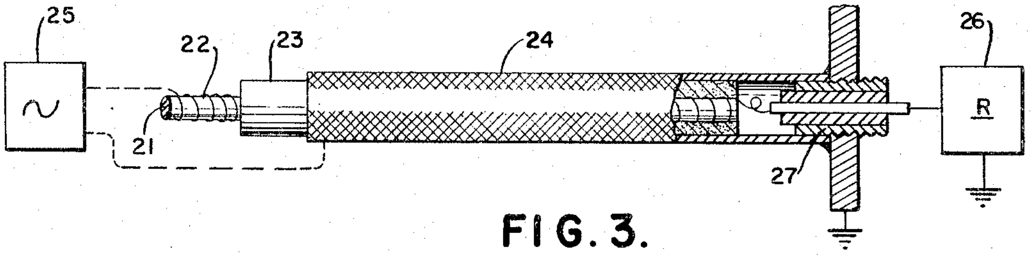
FIGURE 3 is a diagram showing an armored cable according to the invention coupled to a coaxial condenser, the combination thereof being connected in a measuring circuit.

Further new and improved cables according to the invention will now be described which result from combining the absorption losses of the series type caused by microscopic magnetic and/or dielectric resonances with absorption losses of the parallel type. This makes it possible to obtain capacities added to the cable. FIGURE 3 illustrates a length of armored cable comprising an absorbent core 21, a copper wire winding 22 of 0.3 mm. diameter, an absorbent sheath 23, and an outer copper braiding 24, the cable's outside diameter being made about 4.5 mm. Both the core 21 and the sheath 23 are made with the composition No. 3 listed hereinabove. The cable in FIG. 3, having a length of 10 centimeters, is shown connected between a calibrated variable frequency signal generator 25 and a measuring receiver 26, with a coaxial condenser 27 on the output side of the cable connected to receiver 26. With the generator 25 and receiver 26 providing equivalent resistances of 75 ohms terminating the cable, measurements have been taken of the attenuation produced by this cable as a function of frequency for different values of the capacitance C of the coaxial condenser 27.

Figure 4:
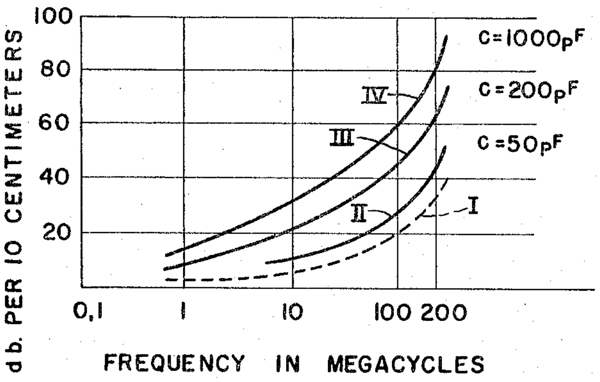
FIGURE 4 is a diagram of the attenuation produced by the combination in FIGURE 3 for various capacitance values of the coaxial condenser, the attenuation being shown as a function of frequency.

FIGURE 4 shows a graph of the results so obtained, first without any condenser 27 (curve I), and then with increasing values of capacitance C of 50, 200, and 1,000 pf. (picofarads) (curves II, III and IV, respectively). These results prove that the anti-interference cable of the invention provides very large attenuation values at high frequencies with relatively low capacitances. In another test using the circuit of FIG. 3 in conjunction with an identical cable with a length of 20 centimeters and a condenser 27 of 4700 pf., it proved possible to obtain an attenuation exceeding 100 decibels per meter beyond 100 megacycles per second.

An anti-interference cable so constructed offers considerable advantages in overcoming VHF (very high frequency, this being normally defined in the art as the frequency range of 30 to 300 megacycles per second) decoupling and filtering problems of various kinds, since uniform absorption is obtained over the wide frequency ranges indicated without any resonant points in the attenuation characteristic. The attenuation due to absorption produced by the cables disclosed herein rises uniformly with frequency up to very high frequencies indeed (1,000 to 10,000 megacycles, for example), as contrasted with the results of conventional self-capacitance filtering methods.

Moreover, the addition of localized capacitances to such cables allows anti-interference protection to be extended to the region of relatively low radio frequencies, e.g., radio transmission frequencies of the order of 1 megacycle per second.

In this invention, losses of the series and the parallel types are combined to produce a true "filter-cable" especially adapted for industrial uses requiring the transmission of currents of several amperes. FIGURE 5 represents the equivalent circuit of a single phase cable having two wires 31 and 32 inside a metal braiding or shield and extending between the input X and the output Y of a section of cable. The resistors R′ and R″ represent the "series type" losses caused by the resonance of microscopic magnetic and/or dielectric doublets of the absorbent material incorporated in the surrounding medium supporting conductors 31 and 32. The condenser $C_1$ between the conductors and the condensers $C_2'$ and $C_2''$ and ground (i.e., the outer armoring braid or shield) represent the losses of the "parallel type." The condenser $C_1$ intervenes or acts with respect to the symmetrical components of the signal on the cable (the potential difference between conductors with symmetry relative to ground), while the condensers $C_2'$ and $C_2''$ intervene or act respecting the asymmetrical components (potential differences existing relative to ground, without considering the potential difference between the wires). The lines 36 in FIGURE 5 illustrate the paths followed by the asymmetrical components of the signal on the cable, while the broken line 39 shows the path followed by the symmetrical signal components on the cable.

FIGURE 7 illustrates the detailed construction of a single phase cable of this kind according to the invention. The space surrounding the two conductor wires 31 and 32, which space includes the gap 37 separating these conductors, is entirely filled with a mass 38 of absorbent material. The mass 38 may suitably consist of the composition No. 3 given hereinabove; this mass introduces the "series type" absorption losses represented by the equivalent resistors R′ and R″ in FIG. 5. Separate dielectric blocks 40 are disposed at intervals along the length of the cable, each such block being formed by two superposed half-shells 41 and 42, for example. Each of these blocks is made of a high permittivity dielectric material and provides the capacitance $C_1$ between the wires 31, 32, and also the capacitances $C_2'$ and $C_2''$ between each wire and the armoring braid 43.

Among the materials according to the invention which are especially appropriate for dielectric blocks 40 are the manganese-zinc ferrites, for example "Ferrite III–C," which are characterized by a very high dielectric constant at relatively low frequencies. Other suitable materials are ceramics based on barium titanate or on a mixture of titanates, e.g., of barium, bismuth and strontium. The half-shells 41 and 42 may be pre-molded and then mounted upon the conductor wires as the production of the cable progresses. As an alternative, the various blocks 40 may each be molded in one piece in their actual positions during production of the cable.

Instead of employing the foregoing technique of adding localized constants, wherein the different elements which introduce the resistance and the capacitance factors are alternatively localized along the cable, distributed constants may be used. A construction which involves applying distributed constants to a cable is contemplated in accordance with the invention, wherein the elements in question are intimately admixed on a microscopic scale. FIGURE 8 illustrates an example of such a construction applied to a three phase cable, the equivalent circuit thereof being given by FIGURE 6. Each of the three conductors 33, 34 and 35 is, in this arrangement, encased in its own flexible sheath 46. The three sheaths, when firmly pressed against each other, form a compact bundle as seen in FIGURE 8, the inner surfaces of sheaths 46 becoming suitably flattened or deformed. This bundle is in turn disposed inside an armoring braid or shield 45, with a flexible filling mass 47 inserted in the space between the outside of the bundle and the inner surface of braid 45. An outer protective sheath 48 surrounds the armoring braid 45, completing the three phase cable.

The sheaths 46 according to the invention are made of an intimate mixture of a high permittivity dielectric, such as "Ferrite III–C" or barium titanate, with a flexible high-loss bonder such as Thiokol S. The filling mass 47 may in its turn be formed by a loss producing composition of any of the types identified as No. 1, No. 2 or No. 3 hereabove. It is to be understood that the grain size of the ferrite incorporated in the flexible sheaths 46 will be advantageously chosen in such a manner as to cause this ferrite to produce the absorptive losses mentioned above, while at the same time the large capacitative effect of the ferrite, due to its very high dielectric constant, is being utilized in the cable. While the dielectric constant of ferrites in a pure state may reach enormous values of the order of 100,000, the effective value of its dielectric constant drops considerably in the mixture with the flexible bonder in accordance with the invention. It still remains substantial, however, and is of the order of several tens (20 to 50, for example).

Having described my invention, I claim:

1. A low pass electric cable for transmitting a range of low frequencies without substantial attenuation and for providing substantial absorption over a selected wide range of frequencies in the megacycle range, said cable comprising at least one conducting element, at least one insulating medium at least partially enclosing said conducting element, and at least one conductive return path separated from said conducting element by said insulating medium, said insulating medium including a mixture of materials selected to have a frequency dependent electromagnetic wave attenuation due to absorption losses over said selected range of frequencies substantially as great as the attenuation caused by reactive effects of said mixture of materials, said absorption losses being produced by microscopic magnetic and/or dielectric resonance or relaxation within the mixture of materials, said cable further comprising a body of high permittivity dielectric material connected between said conducting element and said conductive return path and defining a capacitor therebetween, said cable presenting an attenuation increase, in said selected range of frequencies, of at least about three times over the same cable without said body of high permittivity dielectric material defining said capacitor and without said conductive return path.

2. A cable according to claim 1, wherein said high permittivity dielectric material comprises manganese-zinc ferrites.

3. A cable according to claim 1, wherein said high permittivity dielectric material is selected from the group consisting of titanates of barium, bismuth and strontium and mixtures thereof.

4. A cable according to claim 1, wherein said high permittivity dielectric material is in the form of discrete blocks disposed at predetermined intervals along the cable and separated from one another by sections comprising said insulating medium.

5. A cable according to claim 1, wherein said high permittivity dielectric material is intimately and substantially uniformly dispersed throughout said insulating medium throughout the length of said cable.

6. An arrangement as defined in claim 1 wherein said body of high permittivity dielectric material is constituted by material which produces losses of the parallel type.

References Cited by the Examiner

UNITED STATES PATENTS

| | | | |
|---|---|---|---|
| 2,228,797 | 1/1941 | Wasserman | 174—102.2 |
| 2,238,915 | 4/1941 | Peters | 333—79 |
| 2,387,783 | 10/1945 | Tawney | 333—79 |
| 2,622,152 | 12/1952 | Rosch | 174—100.2 |
| 2,669,603 | 2/1954 | Prache | 178—45 |
| 2,727,945 | 12/1955 | Prache | 178—45 |
| 2,782,381 | 2/1957 | Dyke | 333—79 |
| 2,871,453 | 1/1959 | Bradley | 333—31 |
| 2,929,034 | 3/1960 | Doherty | 333—95 |
| 3,125,733 | 3/1964 | Holmbeck | 333—79 |
| 3,191,132 | 6/1965 | Mayer | 333—79 |

FOREIGN PATENTS 809,126 2/1959 Germany.

HERMAN KARL SAALBACH, *Primary Examiner.*

C. BARAFF, *Assistant Examiner.*